United States Patent [19]

Choate et al.

[11] Patent Number: 5,364,914

[45] Date of Patent: * Nov. 15, 1994

[54] MOULDING COMPOSITION COMPRISING A THERMOSET COMPONENT AND THERMOPLAST COMPONENT

[75] Inventors: Martin T. Choate, Winona, Minn.; Patrick McGrail, Saltburn, England; Mark S. Sefton, Northallerton, England; Jeffrey T. Carter, Redcar, England

[73] Assignee: Imperial Chemical Industries PLC, London, England

[ * ] Notice: The portion of the term of this patent subsequent to Nov. 20, 2007 has been disclaimed.

[21] Appl. No.: 747,436

[22] Filed: Aug. 13, 1991

Related U.S. Application Data

[63] Continuation of Ser. No. 416,236, Oct. 2, 1989, abandoned, which is a continuation-in-part of Ser. No. 253,595, Oct. 5, 1988, Pat. No. 4,972,031.

[51] Int. Cl.$^5$ .................. C08L 61/10; C08L 63/02; C08L 63/04; C08L 81/06
[52] U.S. Cl. .................................. 525/505; 525/390; 525/396; 525/481; 525/523; 525/535
[58] Field of Search ............... 525/505, 535, 390, 396, 525/481, 523

[56] References Cited

U.S. PATENT DOCUMENTS

| | | |
|---|---|---|
| 4,108,837 | 8/1978 | Johnson. |
| 4,513,077 | 4/1985 | Isobe et al. . |
| 4,853,442 | 8/1989 | Nguyen ........................ 525/535 |
| 4,972,031 | 11/1990 | Choate et al. ................... 525/535 |

FOREIGN PATENT DOCUMENTS

| | | |
|---|---|---|
| 0130270 | 1/1985 | European Pat. Off. . |
| 0193082 | 9/1986 | European Pat. Off. . |
| 0311349 | 4/1989 | European Pat. Off. . |
| 3322886 | 12/1983 | Germany . |
| 59-01136 | 1/1984 | Japan . |
| 63-33413 | 2/1988 | Japan ............................. 525/535 |
| 1306231 | 2/1973 | United Kingdom ............... 525/535 |

OTHER PUBLICATIONS

Stutz, Herbert et al.; Curable epoxy resin compositions useful for composites. Ger. Offen DE 3,523,318.
Sato, Tadahide et al., Matrix resin compositions for prepregs. Jpn Kokai Tokkyo Koho JP 61,250,021 [86,250,021].
Nakahara, Masanori et al.; Epoxy resin compositions for prepregs. Jpn. Kokai Tokkyo Koho JP 62 57,417 [87 57,417].
Helfand, David et al.; Epoxy resin/polysulfone molding compounds for cured products with excellent humidity and cracking resistence. Eur. Pat. Appl. Ep 151, 553.
Bucknall, C. B. et al.; Phase separation in crosslinked resins containing polymeric modifiers.; Polym. Eng. Sci. 1986, 26(1), 54–62 (Eng).
Hedrick, J. L. et al.; Chemical modification of matrix resin networks with engineering thermoplastics. III. Synthesis and properties of expoxy networks modified with amine terminates poly(aryl ether sulfone) oligomers.; Polym. Prepr (Am Chem. Soc., Div. Polym Chem.) 1985 26(2), 293–5.
Cecere, J. A. et al.; Morphology and properties of amine-terminated poly(arylene etiher ketone)- and poly(arylene ether sulfone)- modified epoxy resin systems. Int SAMPE Symp. Exhib. 1986, 31 (Mater. Sci. Future), 580–8 (Eng.).

*Primary Examiner*—Vasu S. Jagannathan
*Attorney, Agent, or Firm*—Cushman, Darby & Cushman

[57] ABSTRACT

A curable moulding composition in the form of a flowable particulate solid substantially non self-adhesive at temperatures up to 60° C., flowable under shear and self-adhesive at temperatures in the range 60°–150° C. and hardenable at temperature over 150° C., said composition comprising an uncured or partly cured thermoset resin precursor and, mixed intimately therewith, a polyarylsulphone containing the repeating units (Ph $SO_2$ Ph)$_n$ and Ph$^1{}_a$ linked through ether and/or thioether, where Ph is paraphenylene, Ph$^1$ is phenylene, n is 1 to 2 a is 1 to 3 and groups Ph$^1$ are (when a exceeds 1) linked through a single chemical bond or a divalent group other than $SO_2$ or alkylene or are fused together. Preferably the polyarylsulphone contains end-groups of formula —D—Y where D is a divalent aromatic hydrocarbon group and Y is a group reactive with the thermoset precursor and has been incipiently reacted with the thermoset precursor.

8 Claims, No Drawings

MOULDING COMPOSITION COMPRISING A THERMOSET COMPONENT AND THERMOPLAST COMPONENT

This is a continuation of application Ser. No. 07/416,236, filed on Oct. 2, 1989, which was abandoned upon the filing hereof, which was a continuation-in-part of 07/253,595 filed Oct. 5, 1988 now U.S. Pat. No. 4,972,031.

This invention relates to a plastic molding composition comprising a thermoset component and a thermoplast component, to methods of making it and to molded articles made therefrom.

In our EP-A-311349 (published Apr. 12, 1989) we describe such a combination of components in broad detail and with particular reference to the production of fiber-reinforced laminates. We have now found that these components if suitably chosen can be compounded so as to be useful in the molding industry; by molding we mean to include extrusion, and especially injection-molding, compression-molding and transfer-molding.

According to the invention a curable composition is in the form of a flowable particulate solid substantially non self-adhesive at temperatures in the range 60°–150° C. and hardenable at temperatures over 150° C., said composition comprising an uncured or partly cured thermoset resin precursor and, mixed intimately therewith, a polyarylsulphone containing the repeating units (Ph SO$_2$ Ph)$_n$ and Ph$^1_a$ linked through ether and/or thioether, where Ph is paraphenylene, Ph$^1$ is phenylene, n is 1 to 2, a is 1 to 3 and groups Ph$^1$ are (when a exceeds 1) linked through a single chemical bond or a divalent group other than SO$_2$ or alkylene or are fused together.

The intimacy of mixing of the precursor and the polyarylsulphone is preferably at least such that the precursor plasticises the polysulphone to an extent rendering it flowable under shear and thus shapeable at a temperature at least 5° C. below the curing temperature of the precursor, preferably at a temperature in the range 80° to 125° C. At the shaping temperature preferably the polyarylsulphone and the thermoset resin precursor are in mutual solution. The relative molar proportion of the said repeating units is such that on average at least two units (PhSO$_2$Ph)$_n$ are in immediate mutual succession through ether and/or thioether links in each polymer chain present and is preferably in the range 1:99 to 99:1, especially 10:90 to 90:10, respectively. Typically the ratio is in the range 25–50 (Ph$^1$)$_a$, balance (Ph SO$_2$ Ph)$_n$. In particular polyarylsulphones a=1 and the units are I X Ph SO$_2$ Ph X Ph SO$_2$ Ph ("PES"); and II X Ph X Ph SO$_2$ Ph ("PEES")

where X is O or S and my differ from unit to unit; the ratio of I to II (respectively) preferably between 10:90 and 80:20 especially between 10:90 and 55:45.

The preferred relative proportions of the repeating units of the polyarylsulphone may be expressed in terms of the weight percent SO$_2$ content, defined as 100 times (weight of SO$_2$)/(weight of average repeat unit). The preferred SO$_2$ content is at least 22, preferably 23 to 25%. When a=1 this corresponds to PES/PEES ratios of at least 20:80, preferably in the range 35:65 to 65:35. These proportions favourably affect the morphology of the cured composition as will be described below.

The above proportions refer only to the unit mentioned. In addition to such units the polyarylsulphone may contain up to 50% especially up to 25%, molar of other repeating units: the preferred SO$_2$ content ranges (if used) then apply to the whole polymer. Such units may be for example of the formula

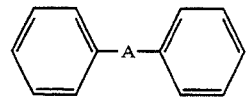

in which A is a direct link, oxygen, sulphur, —CO— or a divalent hydrocarbon radical. When the polyarylsulphone is the product of nucleophilic synthesis, its units may have been derived for example from one or more the following bisphenols and/or corresponding bis-thiols or phenol-thiols:

hydroquinone
4,4'-dihydroxybiphenyl
resorcinol
dihydroxynaphthalene (2,6 and other isomers)
4,4'-dihydroxydiphenyl ether or -thioether
4,4'-dihydroxybenzophenone
2,2'-di-(4-hydroxyphenyl)-propane or -methane.

If a bis-thiol is used, it may be formed in situ, that is, a dihalide as described for example below may be reacted with an alkali sulphide or polysulphide or thiosulphate.

Other examples of such additional units are of the formula

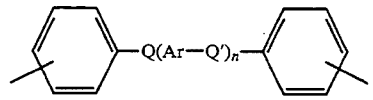

in which Q and Q', which may be the same or different, are CO or SO$_2$; Ar is a divalent aromatic radical; and n is 0, 1, 2, or 3, provided that n is not zero where Q is SO$_2$. Ar is preferably at least one divalent aromatic radical selected from phenylene, biphenylene or terphenylene. Particular units have the formula

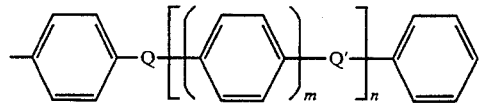

where m is 1, 2 or 3. When the polymer is the product of nucleophilic synthesis, such units may have been derived from one or more dihalides, for example:

4,4'-dihalobenzophenone
4,4' bis-(4-chlorophenylsulphonyl)biphenyl
1, 4 bis-(4-halobenzoyl)benzene
4,4'-bis-(4-halobenzoyl)biphenyl They may of course have been derived partly from the corresponding bisphenols.

The polyarylsulphone may be the product of nucleophilic synthesis from halophenols and/or halothiophenols. In any nucleophilic synthesis the halogen if chlorine or bromine may be activated by the presence of a copper catalyst. Such activation is often unnecessary if the halogen is activated by an electron withdrawing group. In any event fluoride is usually more active than chloride. Any nucleophilic synthesis of the polyarylsulphone is carried out preferably in presence of one or more alkali metal carbonates in up to 10% molar excess over the stoichiometric and of an aromatic sulphone solvent, at a temperature in the range 150°-350° C.

If desired, the polyarylsulphone may be the product of electrophilic synthesis.

The number average molecular weight of the polyarylsulphone is suitably in the range 2000 to 60000. Preferably it is over 9000 especially over 10000 for example 11000 to 25000 and structurally as well as by chemical interaction increases toughness by comparison with that of the thermoset resin alone by providing zones of the tough thermoplast between cross-linked thermoset zones. Another useful sub- range is 3000-11000, especially 3000-9000 in which it acts more as a chain-extender for the thermoset resin, separating and diluting local cross-link zones and thus toughening the structure. Within the above definition of the polyarylsulphone those are preferably chosen which are miscible with suitable epoxy resin precursors, have high modulus and Tg and are tough.

It is convenient to use reduced viscosity (RV), measured on a solution of 1 g of polymer in 100 ml of solution in dimethyl formamide at 25° C. as an indication of molecular weight, the correlation being as follows:

| RV | 0.15 | 0.25 | 0.45 | 0.92 |
|---|---|---|---|---|
| MW (number average) | 5000 | 13000 | 20000 | 60000 |

(Such molecular weights were in fact measured by vapour phase osmometry and are of course subject to the usual error range of about 10%).

The polyarylsulphone preferably contains end groups and/or pendant groups of formula —D—Y where D is a divalent hydrocarbon group, preferably aromatic, and Y is a group reactive with the thermoset precursor or with a curing agent or with like groups on other polymer molecules. Examples of Y are groups providing active hydrogen especially OH, $NH_2$, NHR or —SH where R is a hydrocarbon group containing up to 8 carbon atoms, or providing other crosslinking reactivity especially epoxy, cyanate, isocyanate, acetylene or ethylene, as in vinyl, allyl or maleimide. Preferably at least 50% of the groups Y of the polysulphone are $NH_2$.

In the composition the thermoset precursor is preferably incipiently reacted with the active-ended polyarylsulphone. The extent of reaction is under 50%, especially 2-20%, by mols of the active end groups. Such incipient reaction takes place especially during preparation of the composition by hot-rolling, melt-blending or extrusion.

In preferred forms the composition is characterised by the capacity to form chemical bonds bridging the interface between a thermoset-rich phase and a polyarylsulphone-rich phase present after curing. As a result of the fineness of the mutual dispersion of the two phases, the solubility or swellability of the thermoplast is substantially less than if the thermoset resin were not present. This is so even if the thermoplast is of molecular weight over 10000 or if it is halogen-ended, so that insolubilisation by reaction of end-group with thermoset precursor is limited, if present at all, but is more pronounced when the thermoplast carries thermoset-reactive groups.

The polyarylsulphone constitutes preferably at least 10, for example 20-40, percent by weight of the total resin and polymer present.

The thermoset component can be for example one or more of the following:
  addition-polymerisation resins such as acrylics, vinyls, bis-maleimides (BMI) and unsaturated polyesters;
  formaldehyde condensate resins such as with urea, melamine or phenols
  cyanate resins
  isocyanate resins
  functionalised polyesters, polyamides or polyimides and mixtures of two or more of these.

If an epoxy thermoset component is present it is typically the glycidyl derivative of one or more of:
  aromatic diamines
  aromatic monoprimary amines
  aminophenols
  polyhydric phenols
  polyhydric alcohols
  polycarboxylic acids Thus the epoxy component preferably has at least 2 epoxy groups in its molecule when uncured.

Examples are the following, which are liquids at ambient temperature:
  tetraglycidyl diamino diphenylmethane e.g. "MY 720" or "MY 721" sold by Ciba-Geigy, viscosity 10-20 Pa s at 50° C.;
  triglycidyl derivative of p-aminophenol (e.g. "MY 0510" sold by Ciba-Geigy), viscosity 0.55-0.85 Pa s at 25° C.;
  diglycidyl ether of 2,2-bis (4,4'-dihydroxyphenyl) propane (e.g. "Epikote 828" sold by Shell);
  epoxy novolak (e.g. "DEN 431" sold by Dow), bisphenol F, which is in the low viscosity class;

Other epoxy resin precursors includes cycloaliphatics such as 3',4'-epoxycyclohexyl-3-4-epoxycyclohexane carboxylate (e.g. CY 179 sold by Ciba-Geigy) and those in the "Bakelite" range of Union Carbide Corporation.

The following epoxy resin precursors permit formulation of the composition with fewer precautions to avoid excessive tack:
  EPON 825 (Shell), especially those versions having a viscosity up to 6000 cps at 25° C.
  DER 822 (DOW);
Advanced bisphenol A resin precursors for example:
  DER 661 (DOW), especially in versions having an epoxy equivalent weight (EEW) in the range 475-575:
  EPON 1001 (SHELL), especially those versions having an epoxy equivalent weight in the range 450-550;
Epoxy novolaks, especially those of relatively high molecular weight such as DEN 438, DEN 439 and DEN 485 available from DOW,
Epoxy cresol novolaks, for example ECN 1235, ECN 1273 and ECN 1299 available from Ciba-Geigy;
Tetraglycidyl diamino diphenylmethane of relatively high molecular weight, such as MY 0500 (Ciba-Geigy), which has EEW 105-115 and viscosity 1500-5000 cps at 25° C.;
Diglycidyl phthalate, such as GLY-CELL A100 (ex HI-TEK INTEREZ), having EEW 150-165, viscosity 600-1800 cps at 25° C.

If the thermoset resin component is a BMI resin, it is derived suitably from a precursor of general formula

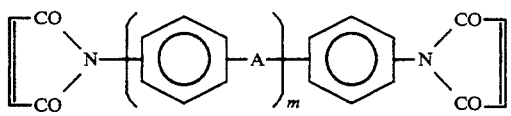

where m is 1 to 4 and A is as defined hereinbefore and the As differ when m exceeds 1.

The thermoset resins are used in conjunction with auxiliaries such as the curing agents, accelerators and catalysts conventionally applicable to them.

In particular, with epoxy resin components the curing agent may for example be an amino compound having a molecular weight up to 500 per amino group, for example an aromatic amine or a guanidine derivative. Particular examples are 3,3'- and 4,4'-diaminodiphenylsulphone, methylenedianiline and dicyandiamide. Such amine curing agents are additional to the amine-ended thermoplast: thus the composition preferably contains epoxy-reactive amines of two types, one having a molecular weight up to 500 per amine group, the other having a molecular weight of at least 5000 per amine group and the total amine content being in the range 70–110% of the stoichiometric requirement of the epoxy resin precursor. Another preferred curing agent for epoxy resins is a novolak. Other standard epoxy curing agents such as aliphatic diamines, amides, carboxylic acid anhydrides, carboxylic acids and phenols can be used if desired. If a catalyst is used, it is typically a Lewis acid, for example boron trifluoride, conveniently as a derivative with an amine such as piperidine or methyl ethylamine. Alternatively it can be basic, for example an imidazole or amine, especially as a "latent" catalyst substantially inactive at below cure temperature.

If a BMI resin is used, there may be present also a reactive diluent such as a bis-allyl compound.

If a phenolic resin is used as the main thermoset component, a formaldehyde generator such as HMT is typically used as curing agent.

In making the composition the auxiliaries can be added to the initial mixture of resin precursors and/or at a later stage in which the mixture is compounded with other materials such as fillers and fibers.

The thermoset component, thermoplast component, the proportions thereof and of other constituents such as fillers, pigments and other polymers, and the degree of cure of the thermoset and of any incipient reaction with the thermoplast, are controlled preferably so that the composition at temperatures up to 60° C., for example up to 100° C., is not self-adhesive under its own weight. That is, it is free of "tack". At the same time, it is flowable as a viscous liquid at temperatures used in shaping it, for example over 150° C. and up to its cure temperature. Preferably also it is flowable under shear at temperatures used in compounding it, for example in the range 80°–125° C. The filler may be chosen to give a composition exhibiting thixotropy or non-Newtonian flow.

The thermoset component and thermoplast component are chosen preferably so that, at least after curing, each of the components is present at least partly as a phase continuous in at least one dimension.

In preferred composition the components are, at least after curing, combined in a network in which each extends continuously through any mass of the composition. On a microscopic scale; one phase is believed to be in the form of a net in 2 or 3 dimensions, and the second phase fills the interstices between the threads of the net. It appears that the first phase is anisotropic on a microscopic scale: the second phase can be isotropic or anisotropic.

The minimum dimension-of each such phase is typically at least 0.005, for example in the range 0.01 to 10, especially up to 5, microns. The maximum dimension of each phase is considerably greater for example L/D at least 10, and may be at least 10% of the geometric dimension of a mass of the composition. The two said phases can be as a result of the curing reactions, the product of spinodal decomposition of an initially substantially homogeneous liquid mixture containing the polyarylsulphone and the uncured or incompletely cured thermoset resin component.

This morphology, evident in cured molded articles may also be evident in the composition when flowable or plastic.

This preferred morphology is obtained especially when the $SO_2$ content is at the above-defined preferred levels.

The composition may contain additives for example conventional toughening agents such as liquid rubbers having reactive groups, aggregates such as glass beads, rubber particles and rubber-coated glass beads, fillers such as polytetrafluoroethylene, graphite, boron nitride, mica, talc and vermiculite, pigments, nucleating agents, and stabilisers such as phosphates. The total of such materials and any fibrous reinforcing agent should be such that the composition contains at least 20% by volume of the polysulphone/thermoset mixture. The percentages of fibers and such other materials are calculated on the total composition after curing at up to 200° C.

The composition is particularly suitable for fabrication of structures, including load-bearing or impact resisting structures. For this purpose it may contain a reinforcing agent such as fibers. Fibers can be added short or chopped typically of mean fiber length not more than 2 cm, for example about 6 mm, typically at a concentration of 5 to 35, preferably at least 20%, by weight on the total dry composition. Advantageously a non-fibrous inorganic filler, for example silica or wollastonite, is present also.

The fiber can be organic, especially of stiff polymers such as poly paraphenylene terephthalamide, or inorganic. Among inorganic fibers glass fibers such as "E" or "S" can be used, or alumina, zirconia, silicon carbide, other compound ceramics or metals. Asbestos may be used if suitable precautions are taken in making the composition and in its subsequent use. A very suitable reinforcing fiber is carbon, especially as graphite. Organic or carbon fiber is preferably unsized or are sized with a material that is compatible with the composition in the sense of being soluble without adverse reaction or of bonding both to the fiber and to the thermoset or thermoplast. In particular carbon or graphite fibers that are unsized or are sized with epoxy resin precursor or thermoplast such as polyarylsulphone can be used. Inorganic fiber preferably is sized with a material that bonds both to the fiber and to the polymer composition: examples are the organo-silane coupling agents applied to glass fiber.

The composition is suitably granules or powder of particle size in the range 0.05 to 2.0 mm. For this purpose the composition can contain any of the above mentioned additives if sufficiently finely divided and/or fibers if sufficiently short. The fibers may be random or parallel.

In another form of the invention a precursor composition is provided as larger pieces each containing substantially parallel continuous fiber. The pieces are for example 2-100, especially 5-30, mm in the direction of the fibers within them. Typically these pieces are comminuted preliminary to molding, in a distinct step or in feeding them to the molding machine.

The invention provides a method of making a molding composition by
(a) making a blend comprising at least one thermoset resin precursor, and at least one polyarylsulphone as defined above, said components being selected and the conditions of blending being controlled so that the polymer and precursor are present as a substantially homogeneous single phase mixture:
(b) removing solvent (if present) from said blend and cooling to give a mixture that is solid at a temperature under 50° C.;
(c) comminuting said solid.

Step (a) can be carried out for example by dissolving the presursor and polymer in a solvent, or melt-blending them optionally in the presence of a solvent for one or the other, or by passing them at least once through an extruder. Fillers, for example short fibers can be present in step (a) or can be incorporated into the product of step (c), for example by means of a roller mill.

If desired, step (b) can be carried out by applying the composition in solution to continuous fibers and removing solvent from the impregnated fibers. Then step (c) is modified (c1) to chopping the impregnated fibers into lengths 2-100, especially 5-30, mm in the direction of the fibers.

Whichever procedure is used, the precursor and polymer are preferably heated together, for example in the blending step or the extruder or the hot roller mill, at a temperature in the range 80°-160° C. to effect the incipient reaction noted above.

The invention provides further a method of making a shaped article by
(d) unless sufficient is already present, mixing a hardener and/or a curing catalyst to the product of step (c) or (c1).
(e) shaping the product of step (d) with, if necessary, application of heat and/or pressure;
(f) maintaining the shaped product of step (e) at a (possibly raised) temperature for a time sufficient to cure the thermoset component of the composition.

The cure temperature is typically in the range 160°-200° C. Cure can be completed in the mold or in a post-cure step. The cure time can be in the range for example 0.2 min to 3 h.

Among the shaping steps usable are:
1. compression-molding especially for printed circuit boards, pump rotors, gears and bearings;
2. injection molding, to give products such as electrical items, especially encapsulated semiconductors and microchips; thus the composition is very suitable for injection about an electrically conducting member;
3. transfer-molding, especially for encapsulation of capacitors, diodes and resistors, and for transformer bushings;
4. extrusion, to give products such as insulated electrical conductors, rods, tubes and special profiles such as window frames and honeycombs.

The common feature of these steps is that the composition is forced into the mold or die at a high rate of shear, in contrast to prior operations involving impregnation of fibers or use as adhesives.

As a result of the high toughness and strength, and low tendency to chipping in manufacture and use, of molded articles made from the composition, these are expected to find application in the automotive industry, in particular as the engine inlet manifold, engine valve cover, water pump and turbine housing.

As a result also of the high dielectric strength of the composition when cured, the invention is of great benefit in electrical applications. Particular examples are connectors, switchgear, housings and supports. Thinner walls are needed for insulation, there is better press fit interference for contacts, and absorption of greater amounts of electrical energy in breaking circuits.

EXAMPLE 1

(a) Composition preparation in liquid form

A polyarylsulphone (PAS) consisting of repeat units I and II as defined above in the mole ratio 40:60, having 70% $NH_2$ end-groups, RV 0.27, and Tg 199° C. was dissolved in methylene chloride to give a 30% by weight solution. To the solution were added the following mixture of epoxy resin precursors:

| MY 0510 | 36.9 | % by weight |
| PY 306 | 32.9 | | together with the hardener

| 3,3'-diaminodiphenylsulphone | 30.1 | to give a PAS content of 35% w/w on total dry resin.

To the mixture the latent curing catalyst 2-phenyl-4-methylimidazole (2% by weight on total resin solids) was added.

The mixture was stirred until apparently homogeneous, (b) Conversion to molding composition Carbon fiber (IM7 6K, ex Hercules) was passed through a dip tank of the mixture at 50-75 cm per min, picking up 50-55% by weight of the solution, then passed through a hot air oven whereby its methylene chloride content was decreased to 5-8%, dry enough to permit chopping. The dry fibers were chopped to average length under 2 mm, then dried further to under 1% volatiles.

The chopped composition-carrying fibers were compression-molded into test specimens at 2500 psi (170 bar) at 170° C. for 15 min, the post cured for 2 h at 177° C. The specimens were tested in a Dynatup instrumented impact tester in comparison with a commercially used epoxidised cresol novolak cured with 5% $BF_3/CH_3NH_2$. The invention specimens:
absorbed about twice the energy
withstood 29-41% more load at failure
showed higher punch shear and flexural strength.

EXAMPLE 2

A composition in liquid form made as in Example 1(a) and including catalyst was heated at 60°-80° C. under a pressure of under 10 mm Hg until apparently dry. The resulting solid, of meringue-like consistency, was ground finely.

A sample of the composition was fed into the barrel of an injection-molding machine, heated therein to 170° C., then forced into a mold. The mold was held at 177° C. for 2 h, then discharged. Molded specimens were tested as in Example 1(b) and standard ASTM specimens were tested for electrical properties in comparison with a commercial material. The invention specimens showed;

25% higher dielectric strength, viz 500 volts per mil
20–25% higher flexural strength
15% higher flexural modulus

| | |
|---|---|
| roll speed ratio | 1.3:1 |
| fast roll temp °C. | 80–120 |
| slow roll temp °C. | 10–20 |
| time, min | 3 |

The resulting sheets were ground to a size range 8–40 mesh.

Test specimens were made by compression molding at 160°–170° C., then cured at this temperature for 5 min. Results are shown in Table 1.

TABLE 1

| Property | Control | A | B | C | D |
|---|---|---|---|---|---|
| % of PAS w/w | 0 | 35 | 25 | 10 | 12 |
| Plasticity Tests | 40 | 3 | 11 | 27 | 33 |
| Spiral flow at 14 tons-inches | | | | | |
| (14 tonnes-cm | 101.6 | 7.62 | 27.54 | 68.88 | 83.82) |
| Brabender - gel time - secs | 126 | 91 | 84 | 98 | 120 |
| torque - meter grams | 250 | 1,000 | 1,000 | 400 | 350 |
| Heat distortion - °C. | 250 | 216 | 217 | 180 | 200 |
| Tg - °C. | 210 | 168 | 186 | 200 | 202 |
| Molding Shrinkage - in/in | .0015 | .0015 | .002 | .002 | .002 |
| (cm/cm | .0038 | .0038 | .005 | .005 | .005) |
| Thermal Coeff of Expansion - ppm | 20 | 27 | 29 | 27 | 30 |
| Tensile strength - psi | 12,500 | 11,600 | 18,400 | 17,700 | 18,200 |
| (MPa | 86.12 | 80.0 | 127 | 122 | 125.5) |
| Tensile mod of elasticity psi $\times 10^6$ | 2.64 | 2.25 | 3.0 | 2.88 | 2.76 |
| (GPa | 18.19 | 15.51 | 20.67 | 19.85 | 19.02) |
| Tensile elongation - % | 0.51 | 0.58 | 0.73 | 0.71 | 0.77 |
| Flexural strength - psi | 10,100 | 17,200 | 27,900 | 26,100 | 21,000 |
| (MPa | 69.6 | 118.6 | 192.3 | 180 | 145) |
| Flexural mod of elasticity psi $\times 10^6$ | 1.82 | 2.20 | 2.36 | 2.26 | 2.20 |
| (GPa | 12.5 | 15.2 | 16.3 | 15.6 | 15.2) |
| Dynatup impact test | | | | | |
| Total energy - ft lbs | 3.7 | 4.1 | 7.0 | 5.1 | 4.9 |
| (Joules | 5.0 | 5.6 | 9.5 | 6.9 | 6.6) |
| Energy at failure-ft lbs | 2.8 | 3.6 | 4.9 | 3.8 | 3.9 |
| (Joules | 3.8 | 4.9 | 6.6 | 5.1 | 5.3) |
| Pounds load at failure - lbs | 310 | 328 | 384 | 390 | 400 |
| (Kg | 141 | 149 | 174 | 177 | 181) |
| Dielectric strength - volts/mil | | | | | |
| S/T | 380 | 385 | 490 | 380 | 490 |
| S/S | 200 | 330 | 470 | 230 | 370 |

15% higher punch shear strength, viz over 40000 psi.

EXAMPLE 3

(a) Phenolic resin precursor was dissolved in a 9:1 w/w mixture of methylene chloride and methanol at ambient temperature. Powdered polyarylsulphone (PAS) consisting of units I and II in the mole ratio 40:60, having MW 16000 and 91% NH$_2$ end groups was dissolved at 4 concentrations in the resin solution at ambient temperature. To the mixture was added hexamethylenetetramine (15% of the total solids of the phenolic resin precursor). The mixture was evaporated at 60° C., less than 5 mm Hg pressure, until it became a dry powder. The powder was ground to pass a 30 mesh screen.

(b) A molding composition was formulated as follows:

| | |
|---|---|
| powder from (a) | 35 g |
| 3.2 mm chopped glass fibers | 30 |
| mould lubricants and colorants | 2 |
| Wollastonite-calcium silicate filler | 33 |

The molding feed was compounded on a two-roll mill:

It is evident that the moldings containing the polyarylsulphone are better in toughness, strength and dielectric strength. The lower Tg and higher expansion coefficient are not significant for many uses. The optimum content of polyarylsulphone is about 25%.

EXAMPLE 4

(a) Epoxy resin precursor DOW DEN 438 was dissolved in a 9:1 w/w mixture of methylene chloride and methanol at ambient temperature. Phenolic resin precursor was dissolved in to the epoxy solution, followed by polyarylsulphone of the type used in Example 3, at 7 concentrations. The mixture was evaporated, ground and screened as in Example 3.

The molding feed was formulated as follows:

| | |
|---|---|
| powder from (a) | 28.5 g |
| 3.2 mm chopped glass fibers | 5.0 |
| mould lubricants and colorants | 2.0 |
| fused silica filler | 64.5 | and compounded as in Example 3.

(b) Epoxy resin DOW DEN 431 was preheated to 150° C. and micronized (under 100 microns) polyarylsulphone of the type used in Example 3 was dissolved in it. The phenolic precursor was melt-mixed into the 150° C. solution. The solution was discharged immediately onto cooling trays at −18° C. and allowed to solidify. Solidification of the mixture occurred at 30° C. or below. The solid resin was ground and micronized to pass a US 30 mesh sieve. The resin powder obtained was then compounded as in (a) above.

(c) Run (b) was repeated with the modification that the three resin components were coarsely mixed at ambient temperature, then fed through an extruder. The extrudate was cooled rapidly to solidify it.

Test specimens of the products of runs a, b and c were made as in Example 3. The results of tests are shown in Table 2.

TABLE 2

| Property | Control A | B | C | D | E |
|---|---|---|---|---|---|
| % of PAS w/w | 0 | 5 | 10 | 15 | 20 |
| Plasticity Tests | 54 | 18 | 13 | 18 | 4.5 |
| EMMI Spiral flow -inches | | | | | |
| (cm | 137 | 46 | 33 | 46) | 11.4 |
| Brabender - gel time - secs | 95 | 75 | 97 | 84 | 70 |
| - torque - meter grams | 0 | 75 | 85 | 65 | 125 |
| Heat distortion - °C. | 127 | 145 | 140 | 158 | 158 |
| Tg - °C. | 138 | 139 | 133 | 132 | 135 |
| Molding Shrinkage - in/in | .002 | .002 | .002 | .002 | .002 |
| (cm/cm | .005 | .005 | .005 | .005) | .005 |
| Thermal Coeff of Expansion - ppm | 43 | 37 | 38 | 36 | 35 |
| Tensile strength - psi | 5,900 | 6,200 | 5,800 | 5,600 | 8,500 |
| (GPa | 40.7 | 42.7 | 40.0 | 38.6) | 58.6 |
| Tensile mod of elasticity psi × $10^6$ | 1.7 | 2.2 | 2.0 | 2.0 | 2.0 |
| (MPa | 11.7 | 15.2 | 13.8 | 13.8) | 13.7 |
| Tensile elongation - % | 0.34 | 0.29 | 0.29 | 0.28 | 0.47 |
| Flexural strength - psi | 16,200 | 14,200 | 11,900 | 13,300 | 14,700 |
| (MPa | 111.7 | 97.9 | 82.0 | 91.7) | 101.34 |
| Flexural mod of elasticity psi × $10^6$ | 2.0 | 2.1 | 1.9 | 2.0 | 1.9 |
| (GPa | 13.8 | 14.4 | 13.0 | 13.8) | 13.0 |
| Dynatup impact test | | | | | |
| Total energy - ft lbs | 2.7 | 3.5 | 3.6 | 3.4 | 3.4 |
| (Joules | 3.7 | 4.7 | 4.9 | 4.0) | 4.6 |
| Energy at failure-ft lbs | 1.5 | 2.2 | 2.4 | 2.6 | 2.9 |
| (Joules | 2.0 | 3.0 | 3.2 | 3.5) | 3.9 |
| Pounds load at failure - lbs | 219 | 288 | 280 | 270 | 312 |
| (Kg | 99.3 | 131 | 127 | 122.5) | 141.5 |
| Dielectric strength - volts/mil | | | | | |
| S/T | 365 | 320 | 360 | 480 | 640 |
| S/S | 330 | 360 | 350 | 450 | 520 |

| Property | F | G | H | (b) | (c) |
|---|---|---|---|---|---|
| % of PAS w/w | 25 | 30 | 35 | 35 | 35 |
| Plasticity Tests | 25.5 | 8 | 8 | 9 | 11 |
| EMMI Spiral flow -inches | | | | | |
| (cm | 64.8 | 20.3 | 20.3 | 22.9 | 27.9) |
| Brabender - gel time - secs | 119 | 91 | 90 | 92 | 88 |
| - torque - meter grams | 100 | 200 | 350 | 355 | 410 |
| Heat distortion - °C. | 152 | 153 | 156 | 160 | 160 |
| Tg - °C. | 135 | 136 | 146 | 150 | 150 |
| Molding Shrinkage - in/in | .002 | .002 | .002 | .002 | .002 |
| (cm/cm | .005 | .005 | .005 | .005 | .005) |
| Thermal Coeff of Expansion - ppm | 30 | 34 | 32 | 34 | 27 |
| Tensile strength - psi | 10,200 | 12,000 | 12,500 | 14,300 | 17,500 |
| (GPa | 70.3 | 82.7 | 86.2 | 98.6 | 120.6) |
| Tensile mod of elasticity psi × $10^6$ | 2.1 | 2.1 | 2.0 | 2.36 | 2.32 |
| (MPa | 14.5 | 14.5 | 13.7 | 16.2 | 16.0) |
| Tensile elongation - % | 0.53 | 0.63 | 0.72 | 0.72 | 0.992 |
| Flexural strength - psi | 17,500 | 19,500 | 20,000 | 22,500 | 26,100 |
| (MPa | 121.0 | 134.4 | 137.8 | 155.1 | 180) |
| Flexural mod of elasticity psi × $10^6$ | 2.0 | 2.0 | 1.9 | 2.27 | 2.28 |
| (GPa | 13.8 | 13.8 | 13.0 | 15.6 | 15.7) |
| Dynatup impact test | | | | | |
| Total energy - ft lbs | 5.7 | 6.2 | 8.5 | 6.81 | 8.06 |
| (Joules | 7.7 | 8.4 | 11.5 | 9.2 | 10.9) |
| Energy at failure-ft lbs | 4.0 | 3.0 | 2.0 | 5.23 | 3.76 |
| (Joules | 5.4 | 4.1 | 2.7 | 7.1 | 5.1) |
| Pounds load at failure - lbs | 322 | 319 | 277 | 330 | 295 |
| (Kg | 146 | 145 | 126 | 150 | 134 |
| Dielectric strength - volts/mil | | | | | |
| S/T | 550 | 700 | 700 | — | — |
| S/S | 450 | 530 | 530 | — | — |

It is evident that the moldings containing the polyarylsulphone are again better in toughness, strength and dielectric strength. There is a significant increase at higher PAS contents but a slight improvement in Tg and HDT.

Use in making electrical connectors

Specimens of the powder were injection-molded and cured, then subjected to standard mechanical tests. Results are shown in Table 3.

TABLE 3

| | Invention | Control | % Change |
|---|---|---|---|
| TENSILE STRENGTH (KSI) | 14.7 | 9.5 | +54.7 |
| (MPa) | 101.3 | 65.5 | |
| TENSILE MODULUS (MSI) | 1.95 | 2.2 | −11.3 |
| (GPa) | 13.4 | 15.2 | |
| TENSILE STRAIN (%) | 0.94 | 0.41 | +129 |
| FLEXURAL STRENGTH (KSI) | 19.7 | 16.5 | +19.4 |
| (MPa) | 136 | 114 | |
| FLEXURAL MODULUS (MSI) | 1.74 | 1.95 | −10.8 |
| (GPa) | 12.0 | 13.4 | |
| COMPRESSIVE YIELD (KSI) | 38.0 | 39.5 | −3.8 |
| (MPa) | 262 | 272 | |
| IMPACT DYNATUP | | | |
| TOTAL ENERGY (FT LBS) | 5.86 | 3.92 | +49.4 |
| (JOULES) | 7.94 | 5.31 | |
| ENERGY at FAILURE (FT LBS) | 5.30 | 2.95 | +80.0 |
| (JOULES) | 7.2 | 4.0 | |
| MAXIMUM LOAD (LBS) | 355 | 318 | +11.6 |
| (Kg) | 151 | 144 | |
| CRACK INITIATION ENERGY (FT LBS) | 0.60 | 0.32 | +87.5 |
| (JOULES) | 0.81 | 0.43 | |
| NOTCHED SIDE IZOD IMPACT (FT LBS/IN) | 0.681 | 0.321 | +112 |
| (Kjm) | 12.75 | 6.01 | |
| THERMAL | | | |
| TMA TG (°C.) | 150 | 160 | −6.25 |
| 50–150° C. (PPM) | 38 | 33 | +15.1 |

Molding powders "Control A" and H were used to make electrical connectors for a bulkhead application in which twisting forces are substantial. The connectors were molded at 500 psig (35.5 bars) and cured 15 min at 320° F. (160° C.). The torque strength (in lbs) of the connectors was:

| Control A | 50 |
|---|---|
| H | 110 |

EXAMPLE 5

The Example 4 (b) resin mixture preparation was repeated using the following ingredients, weight percent:

| Resin mix | Example 5 (invention) | Example 5 (control) |
|---|---|---|
| Bisphenol A epoxy resin base ("KUKDO" YDF-165: bisphenol F type. visc 700–1100 cps; EE 160–180) | 47 | 72 |
| Novolac, phenolic (low visc.) (Schenectady HRJ 1166) | 18 | 28 |
| NH₂-ended PES/PEES (40:60) molecular weight about 17000 | 35 | — |

The resulting powder was formulated as follows, weight per cent:

| Resin mix | 40 | 40 |
|---|---|---|
| 325 mesh fused silica | 49 | 49 |
| 3.2 mm chopped glass fiber | 10 | 10 |
| mould lubricants + pigment | 0.7 | 0.7 |
| accelerator 2-methylimidazole | 0.3 | 0.3 | and compounded by roll-milling at 99°–108° C., then grinding to the size range 8 to 40 mesh.

EXAMPLE 6

The Example 4(a) resin mixture preparation was repeated using the following ingredients, weight percent:

| Resin | Example 6 (invention) | Example 6 (control) |
|---|---|---|
| Epoxy novolac (DOW DEN 431) | 43.75 | 67.3 |
| Curing agent 4,4″-diamino-1,4-bis(phenyl-dimethyl-methylene)benzene. (Shell EPON HPT) | 21.25 | 32.7 |
| NH₂-ended PES/PEES 40:60 molecular weight about 17000 | 35.0 | — |

The resulting powder was formulated, compounded and ground as in Example 5. Test Specimens of the product were made by injection molding and curing. Results of mechanical tests are shown in Table 4.

TABLE 4

| | Invention | Control | % Change |
|---|---|---|---|
| Compressive Yield (KSI) | 35.0 | 28.0 | +25.0 |
| (MPa) | 241 | 193 | |
| Tensile Strength (KSI) | 12.6 | 6.7 | +88.0 |
| (MPa) | 87.0 | 46.0 | |
| Tensile Modulus (MSI) | 1.71 | 1.98 | −13.6 |
| (GPa) | 11.8 | 13.6 | |
| Tensile Strain (%) | 0.82 | 0.41 | +100 |
| Flexural Strength (KSI) | 19.3 | 13.1 | +47.3 |
| (MPa) | 133 | 90.3 | |
| Flexural Modulus (MSI) | 1.53 | 1.73 | −11.6 |
| (GPa) | 14.54 | 11.9 | |
| Dynatup Impact | | | |
| Total Energy (Ft. Lbs.) | 6.65 | 6.68 | −0.45 |
| (Joules) | 9.0 | 9.1 | |
| Energy & Failure (Ft. Lbs.) | 5.38 | 4.50 | +19.5 |
| (Joules) | 7.3 | 6.1 | |
| Maximum Load (Lbs.) | 354 | 307 | +15.3 |
| (Kg) | 160 | 139 | |
| Crack Initiation Energy | 0.75 | 0.41 | +83.0 |

TABLE 4-continued

|  | Invention | Control | % Change |
|---|---|---|---|
| (Ft. Lbs.) |  |  |  |
| (Joules) | 1.01 | 0.56 |  |
| Notched Side Izod Impact | 1.75 | 0.540 | +220 |
| (Ft. Lbs.) |  |  |  |
| (Kj/m) | 32.7 | 10.1 |  |
| TMA Tg °C. | 145 | 138 | +5.0 |
| 50–150° C. (PPM) | 39 | 41 | −4.9 |

We claim:

1. A curable molding composition in the form of a flowable particulate solid substantially non-self adhesive at temperature up to 60° C., flowable under shear and self-adhesive at temperatures in the range 60°–150° C. and hardenable at temperature over 150° C., said composition comprising a thermosetting component and, mixed intimately therewith, a thermoplastic component, said thermosetting component comprising an uncured or partly cured thermoset resin precursor selected from the group consisting of epoxy resin precursors, phenolic resin precursors and mixtures thereof and a curing agent for said thermoset resin precursor, said thermoplastic component comprising a polyarylsulphone containing the repeating units $(Ph-SO_2-Ph)_n$ and $Ph^1_a$ linked through ether and/or thioether, where Ph is paraphenylene, $Ph^1$ is phenylene, n is 1 to 2, a is 1 to 3 and groups $Ph^1$ are (when a exceeds 1) linked through a single chemical bond, a divalent group, or are fused together, wherein said divalent group is not $SO_2$ or alkylene, said composition containing from 5 up to 40 weight percent of polyarylsulphone.

2. A composition according to claim 1 in which the units of the polyarylsulphone are I X Ph $SO_2$ Ph X PhSO$_2$ Ph; and
II X Ph X Ph $SO_2$ Ph in the ratio of units I to II is 10:90 to 80:20, where X is oxygen or sulphur and may differ from unit to unit.

3. A composition according to claim 1 in which the polyarylsulphone contains end-groups of formula —D—Y where D is a divalent aromatic hydrocarbon group and Y is a group reactive with the thermoset precursor.

4. A composition according to claim 3 in which at least 50% of groups Y are $NH_2$.

5. A composition according to claim 1 containing at least one filler selected from the class consisting of random fibres, parallel fibres and non-fibrous particulates.

6. A composition according to claim 1 in which the particulate solid is chopped strand or crushed sheet or agglomerated fine particles.

7. A composition according to claim 1 wherein the epoxy resin precursor is a glycidyl derivative of one or more of the following:
   aromatic diamines, aromatic monoprimary amines, amino phenols, polyhydric phenols, polyhydric alcohols, and polycarboxylic acids.

8. In a molding composition comprising a curable resin precursor selected from the group consisting of epoxy resins, phenol-formaldehyde resins and combinations thereof, the improvement which comprises having intimately mixed therewith, polyarylsulphone containing the repeating units $(Ph\ So_2\ Ph)_n$ and $Ph^1_a$ linked through ether, where Ph is paraphenylene, $Ph^1$ is phenylene, n is 1 to 2, a is 1 to 3 and groups $Ph^1$ are (when a exceeds 1) linked through a single chemical bond, said composition containing from 5 up to 40 weight percent of polyarylsulphone.

* * * * *